May 4, 1926.
C. P. BROCKWAY
MOTOR DRIVE
Filed Dec. 30, 1920
1,583,275
Fig. I.
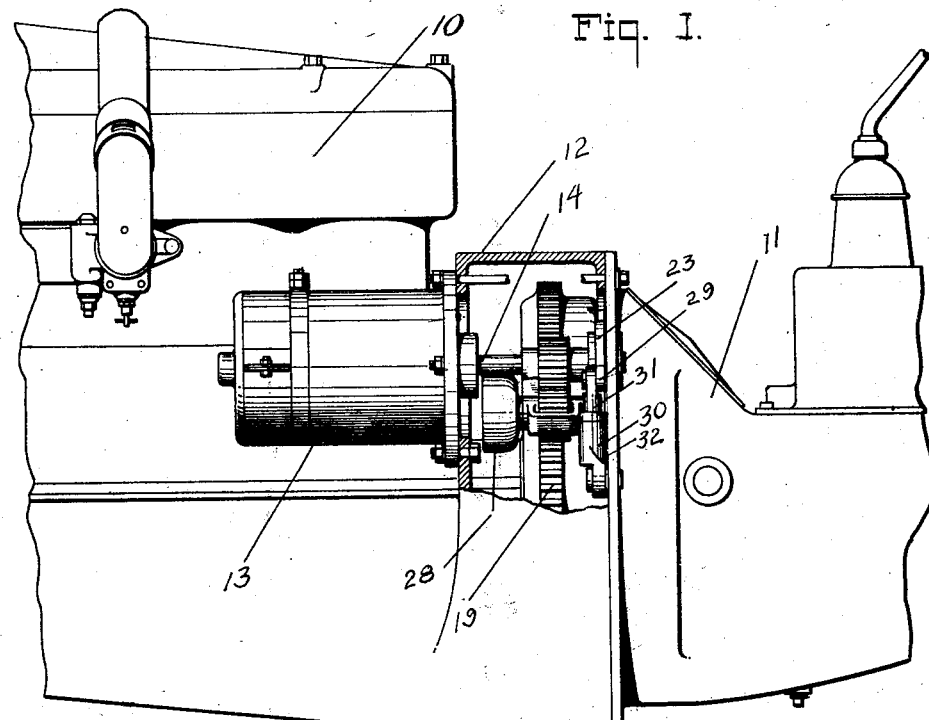
Fig. II.
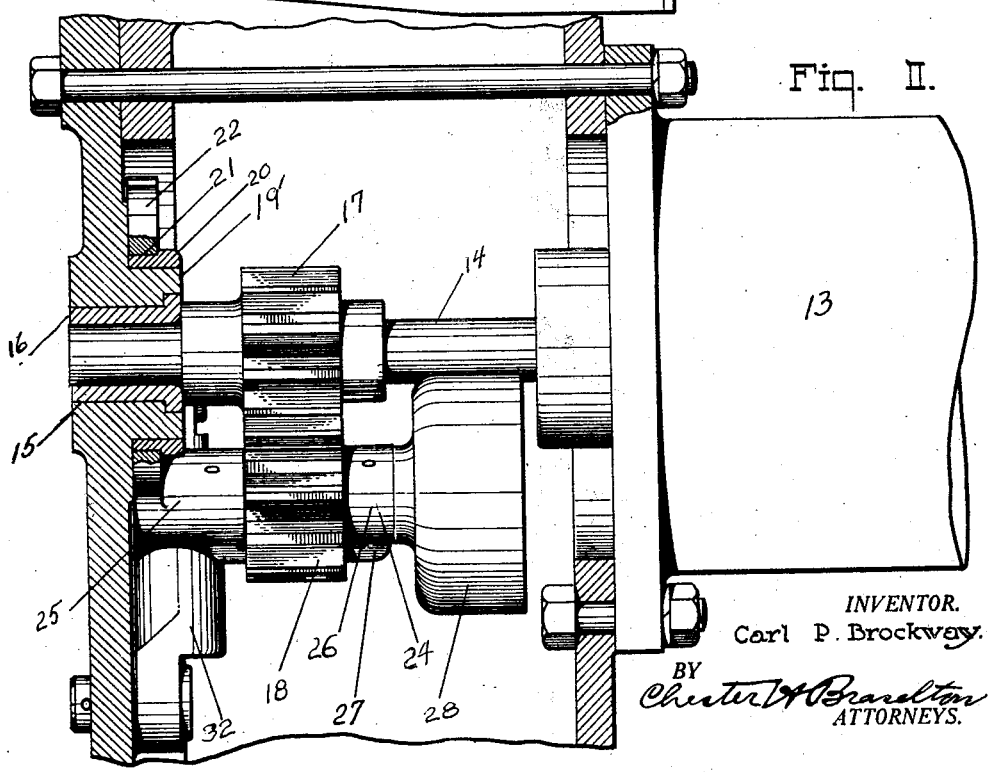
INVENTOR.
Carl P. Brockway.
BY
Chester H. Braselton
ATTORNEYS.

Patented May 4, 1926.

1,583,275

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

MOTOR DRIVE.

Application filed December 30, 1920. Serial No. 434,106.

*To all whom it may concern:*

Be it known that I, CARL P. BROCKWAY, a citizen of the United States, residing at Toledo, county of Lucas, and State of Ohio, have invented certain new and useful Improvements in Motor Drives, of which I declare the following to be a full, clear, and exact description.

This invention relates to engine starting mechanism as applied particularly to internal combustion engines or other engines which are normally non-self starting but require the application of some external power means to initiate operation. The invention more specifically relates to that type of disconnectible drive in which the power gear moves in a plane transverse to the motor axis.

Among the important objects of the invention is the employment of a transverse type of drive wherein the shaft strain due to transverse power transmission is practically eliminated.

An important object also is to make more efficient and positive a drive of this type by increasing the inertia of the revoluble parts. An object also is to utilize mechanism for preventing clash of the gears at contact thus making employement of the greater mass in the revoluble parts more feasible.

Other objects relating to structural details will become apparent in the subsequent detailed description of the preferred embodiment of my invention in which—

Figure I is a view of the mechanism applied to an automobile engine flywheel and electric motor; and Figure II is a detail view of the drive mechanism looking at the side the reverse of that shown in Figure I.

Generally stated the invention is embodied in a two gear transverse drive to an engine fly-wheel, the one gear being mounted on a portion of the engine, and the other gear being fixed to a motor shaft, the two gears being in mesh and the engine gear being adapted to be swung into mesh with the engine fly-wheel through the rotation of the motor gear.

In the drawings I have shown portions of the power plant of an automobile including an engine 10 and transmission casing 11. To a portion of the engine casing 12 is mounted an electric motor 13 which latter is of the conventional design and forms no part of my invention. It is, of course, understood that any other form of motor, such as a pneumatic or spring motor may be utilized in place of an electric motor. The motor shaft 14 is extended so that its end has a bearing in the opposite side wall of the fly-wheel portion of the engine casing 12. For this purpose the casing is apertured as at 15 and a bushing 16 inserted therein. The portion of the casing immediately surrounding the aperture is extended inwardly to form an annular ledge for a purpose hereinafter to be described.

Fixed to the motor shaft within the flywheel casing is a gear 17 which is normally in enmeshment with a second gear 18 which latter is adapted to be moved into and out of contact with gear teeth formed on the periphery of the engine fly-wheel 19. Fitted on the ledge 19' of the casing hereinbefore described is an annular bearing 20, the periphery of which is cut to form an inner groove channel 21, and in this channel a plate 22 is mounted for rotatable movement. A portion of the plate 22 is extended as at 23 and to this extended portion the support 24 of the gear 18 is fixed. The support 24 preferably consists of two hollow cylindrical bearings 25 and 26 connected by means of a yoke 27 and in this support a shaft is mounted which is adapted to carry the gear 18 and also at one end thereof the fly-wheel element 28. The fly-wheel element is of cup-shaped formation, the base of the cup being fixed to the gear shaft and the walls of the cup extending parallel to said shaft so that the greater part of the flywheel is in proximity to its circumference, thereby giving a maximum value of inertia thereto.

To an extension 29 of the plate 22 is attached a shock absorbing element 30 which comprises a plunger element 31 pivotally secured to the plate extension 29 and a cylinder element 32 pivotally mounted on the engine casing.

The principle of operation of the plunger element is familiar, involving the movement of the plunger 31 in the hollow cylinder 32 against a body of entrapped air which escapes less rapidily than it is compressed; the initial movement of the plunger being rapid and the final movement of the plunger being slow.

The normal position of the two gears 17 and 18 is approximately vertical, the mass of the gear 18 with its related fly-wheel element being sufficient to maintain it in the proper position.

In the operation of this type of starting mechanism with the gears in the normal vertical position, the revoluble gear 18 being out of mesh with the fly-wheel gear, initial rotation of the motor shaft imparts rotation to the gear 17, which in turn causes rotation of the gear 18 and its connected fly-wheel 28. By virtue of the inertia of the gear 18 and fly-wheel 28 the force of rotation of the gear 17 tends to impart bodily movement of the gear 18 and thus brings this gear into mesh with the fly-wheel gear 19. Because of the inertia of this system, however, the movement of the gear 18 into mesh with the engine fly-wheel gear will be so rapid as to cause noise and wear to an undesirable extent and utilization of the shock absorbing mechanism 32 tends to prevent this effect, thereby permitting an initial rapid movement toward engagement of the gears and a subsequent less rapid movement of final engagement. The final result obtained by this arrangement is an ideal compromise between that wherein the mass of the revoluble element is small and where the mass is large, the advantageous factors of both being utilized in a successful and practical manner.

When the engine starts up under its own power the sudden acceleration of the engine fly-wheel serves to throw out the gear 18 from enmeshment with the fly-wheel.

An important advantage in the invention resides in the fact that very little strain is imparted to the motor shaft tending to distort the same or bend it out of proper alignment. This is due to the end bearing of the motor shaft in the end casing as above described and to the fact that the bodily movable elements 18 and 28 are pivotally mounted upon the engine frame only, and not upon the motor shaft as has been customary in previous designs of transverse starting mechanism.

I am aware that the particular embodiment of my invention above described, and illustrated in the accompanying drawings, is susceptible of considerable variation without departing from the spirit thereof, and therefore I desire to claim my invention broadly as well as specifically as indicated by the appended claims.

I claim:—

1. In a starting mechanism, a toothed fly-wheel and housing therefor, an electric motor and housing therefor, a gear wheel operatively connected to said motor, a gear wheel pendulously mounted on said fly-wheel housing for swinging movement toward and away from said fly-wheel, said third-mentioned gear wheel being normally in contact with said second mentioned gear wheel and normally out of contact with said fly-wheel, and means for energizing said motor and for causing said third named toothed wheel to establish a driving connection between said second and first mentioned toothed wheels.

2. In a starting mechanism for gas engines, the combination of a flywheel; a housing for said flywheel; a motor having a shaft; a gear on said motor shaft adjacent the flywheel; a second gear in mesh with the first named gear and pivotally mounted on said housing for limited bodily movement toward and from said flywheel and adapted to engage with said flywheel for transmission of power thereto; and means for energizing said motor and causing said second gear to establish driving connection between the first gear and the flywheel.

3. In a starting mechanism for gas engines, the combination of a rotatable engine member; a housing therefor; a motor; a gear wheel operatively connected to said motor; a second gear wheel pivotally mounted on said housing for swinging movement toward and from said engine member, said gear wheel being normally in contact with said first gear wheel and normally out of engagement with said engine member; and means for energizing said motor and for causing said second gear wheel to establish a driving connection between the first gear wheel and the engine member.

In testimony whereof, I affix my signature.

CARL P. BROCKWAY.